United States Patent [19]
Ishigaki et al.

[11] 3,775,557
[45] Nov. 27, 1973

[54] TRANSISTOR CIRCUIT

[75] Inventors: Yoshio Ishigaki, Tokyo; Takao Tsuchiya, Fujisawa, both of Japan

[73] Assignee: Sony Corporation, Shinagawa-ku, Tokyo, Japan

[22] Filed: Mar. 3, 1972

[21] Appl. No.: 231,763

Related U.S. Application Data

[63] Continuation of Ser. No. 32,534, April 28, 1970, abandoned.

[30] Foreign Application Priority Data

May 1, 1969 Japan ............................... 44/34195

[52] U.S. Cl. ................ 178/5.4 SD, 307/232, 329/50
[51] Int. Cl. ........ H04n 9/50, H03k 5/20, H03d 3/18
[58] Field of Search ................ 178/5.4 SD; 307/232, 307/239, 242, 295; 329/50; 330/30 D, 38 M

[56] References Cited

OTHER PUBLICATIONS

"Integrated Circuits for Television Receivers", E. Sugata et al., IEEE Spectrum May 26, 1969, pp. 64–74.

*Primary Examiner*—Robert L. Griffin
*Assistant Examiner*—George G. Stellar
*Attorney*—Hill, Sherman, Meroni, Gross & Simpson

[57] ABSTRACT

A transistor detection circuit for use as an integrated circuit device including a pair of transistors which are coupled between a power supply and a constant current source. Each of the transistors have corresponding electrodes cross-coupled. A second pair of transistors provides a switching control network to regulate the conduction of the first pair of transistors. When signals of opposite polarities are coupled to the two inputs of the first two transistors, and a switching signal is coupled to the control transistors, an output signal is derived which is twice the magnitude that would otherwise be available if an input signal were coupled only to one of the two transistors. The transistor circuit of the present invention is useable as a phase detection circuit and in particular is readily adaptable to a color demodulator for detecting color different signals in a conventional television receiver.

4 Claims, 15 Drawing Figures

INVENTOR.
YOSHIO ISHIGAKI
TAKAO TSUCHIYA
BY Hill, Sherman, Meroni, Gross & Simpson ATTORNEYS

INVENTORS
YOSHIO ISHIGAKI
TAKAO TSUCHIYA

BY Hill, Sherman, Meroni, Gross & Simpson ATTORNEYS

INVENTORS

YOSHIO ISHIGAKI

TAKAO TSUCHIYA

BY Hill, Sherman, Meroni, Gross & Simpson ATTORNEYS

TRANSISTOR CIRCUIT

This application is a continuation of application Ser. No. 32,534 filed Apr. 28, 1970 by Yoshio Ishigaki and Takao Tsuchiya, now abandoned.

BACKGROUND OF THE INVENTION

1. Description of the Prior Art

Recent attempts have been made to develop integrated transistor circuits. However, the inductance and capacitance elements usually associated with such circuits greatly impede the development of such circuits as integrated networks. Prior attempts to make such circuits of transistors, diodes, resistors without employing energy storage elements have usually been exceedingly complex and difficult to construct.

2. Field of the Invention

The field of art to which this invention pertains is transistor circuits and in particular to novel circuits for use as integrated transistor networks.

SUMMARY OF THE INVENTION

It is a principal feature of the present invention to provide an improved transistor circuit which is well suited for integration.

It is also a feature of the present invention to provide a transistor circuit which may be controlled by a switching operation and which is readily adaptable as an integrated circuit.

It is a principal object of the invention to provide a transistor circuit having a pair of input transistors coupled directly to a constant current source and having one of their electrodes cross-coupled with the corresponding electrode of the other transistor.

It is another object of the present invention to provide a transistor circuit as described above wherein a pair of transistors are used to control the switching operation of the input transistors.

It is another object of the present invention to provide a transistor circuit which is capable of performing a plurality of different functions.

A further object of the present invention is to provide a transistor circuit which may be operated as a differential amplifier.

It is another object of the present invention to provide a transistor circuit which may be used as a phase detector.

It is a further object of the present invention to provide a novel color demodulator circuit for detecting the color difference signals in a television receiver.

These and other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE PREFERRED EMBODIMENTS

Figure 1:
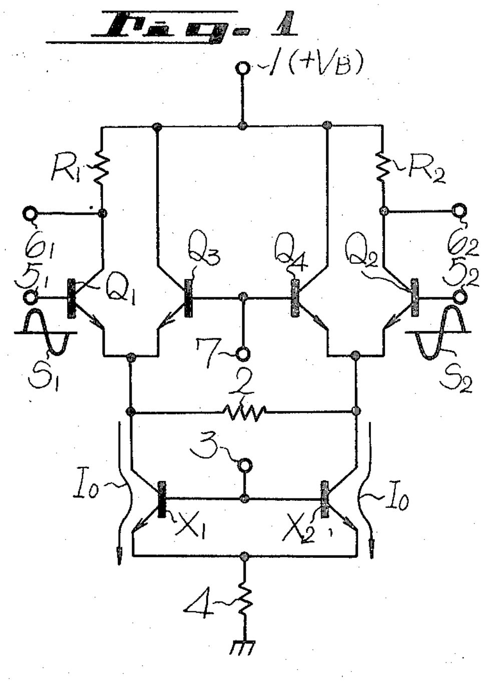
FIG. 1 is a schematic showing one example of a transistor circuit according to this invention.

In FIG. 1 there is illustrated one example of the transistor circuit of this invention, in which first and second transistors $Q_1$ and $Q_2$ have their emitters respectively connected to the emitters of third and fourth transistors $Q_3$ and $Q_4$. The connection point of the emitters of the first and third transistors $Q_1$ and $Q_3$ is connected to the collector of a transistor $X_1$ which serves as a constant-current source, and the connection point of the emitters of the second and fourth transistors $Q_2$ and $Q_4$ is similarly connected to the collector of a transistor $X_2$ which serves as a constant-current source.

The first and second transistors $Q_1$ and $Q_2$ have their collectors connected to a power source terminal 1 through load resistors $R_1$ and $R_2$ respectively and the third and fourth transistors $Q_3$ and $Q_4$ have their collectors directly connected to the power source terminal 1. The connection point of the emitters of the first and third transistors, $Q_1$ and $Q_3$, and the connection point of the emitters of the second and fourth transistors, $Q_2$ and $Q_4$, are interconnected through a resistor 2. They may also be connected directly.

The bases of the transistors $X_1$ and $X_2$ are supplied with a fixed bias voltage from a power source terminal 3, and their emitters are interconnected and grounded through a resistor 4. The bases of the first and second transistors $Q_1$ and $Q_2$ are respectively connected to input terminals $5_1$ and $5_2$ and are supplied with a suitable bias voltage. Their collectors are respectively connected to output terminals $6_1$ and $6_2$. The bases of the third and fourth transistors $Q_3$ and $Q_4$ are connected to a common control signal input terminal 7. Both transistors $X_1$ and $X_2$ operate in their collector saturation regions and act as constant-current sources such that substantially no change is caused in their collector currents even by a change in their collector potentials.

Figures 5A, 5B, 5C, 5D, 5E:
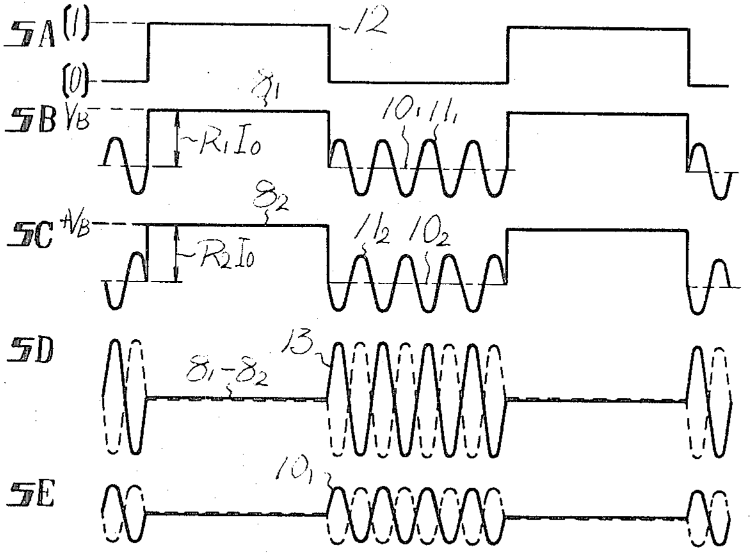
FIGS. 5A through 5E show a series of waveforms for explaining the transistor circuit of this invention.

Assume that the base of the first transistor $Q_1$ is supplied with an AC input signal $S_1$ through the terminal $5_1$, and the bases of the third and fourth transistors $Q_3$ and $Q_4$ are supplied with a control signal 12 such as depicted in FIG. 5A through the terminal 7. When the control signal 12 is in the state "1" (FIG. 5A) the transistors $Q_3$ and $Q_4$ are in the "on" state, in which case the transistors $Q_1$ and $Q_2$ are cut off due to a rise in their emitter potentials. Therefore, switching "on" the transistors $Q_3$ and $Q_4$ causes this circuit not to function as a differential amplifier. The result is a DC voltage $V_B$, such as indicated by straight lines $8_1$ and $8_2$ in FIGS. 5B and 5C, is derived at the output terminals $6_1$ and $6_2$.

When the control signal 12 is in the state of "0", the transistors $Q_3$ and $Q_4$ are turned "off", and the transistors $Q_1$ and $Q_2$ are switched "on". In this case, if the characteristics of the transistors $Q_1$ and $Q_2$, $X_1$ and $X_2$ and the resistance values of the resistors $R_1$ and $R_2$ are equal to each other, collector DC currents $I_0$ which flow to the transistors $Q_1$ and $Q_2$, respectively, flow to the transistors $X_1$ and $X_2$.

Figure 2:
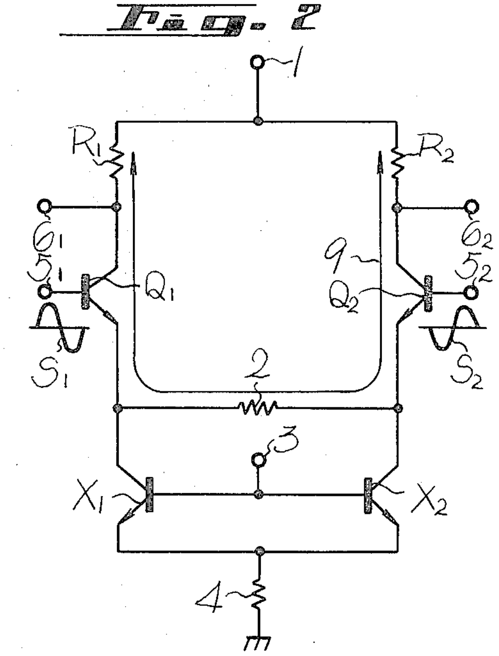
FIG. 2 is a further schematic showing the operation of the transistor circuit depicted in FIG. 1.

When the input signal $S_1$ is supplied to the base of the transistor $Q_1$, a signal current flows to the transistors $Q_1$ and $Q_2$ in accordance with this input signal. In the positive half cycle of the signal $S_1$, the collector current of the transistor $Q_1$ increases, however, the collector currents of the transistors $X_1$ and $X_2$ are respectively held constant, and accordingly the signal current based on the input signal $S_1$ flows in the transistor $Q_1$, the resistor 2 and the transistor $Q_2$ as indicated by an arrow 9 in FIG. 2. In the negative half cycle of the signal $S_1$ the signal current flows in a reverse direction. In this case the circuit serves as a differential amplifier relative to the input signal and derives at the output terminals $\mathbf{6}_1$ and $\mathbf{6}_2$ AC output signals $\mathbf{11}_1$ and $\mathbf{11}_2$ varying about DC levels indicated by broken lines $\mathbf{10}_1$ and $\mathbf{10}_2$ in FIG. 5B and 5C. The DC levels have been lowered from the power source voltage $V_B$ by voltage drops $R_1I_0$ and $R_2I_0$ of the resistors $R_1$ and $R_2$ due to the collector DC currents $I_0$ of the transistors $Q_1$ and $Q_2$. The resulting output signals $\mathbf{11}_1$ and $\mathbf{11}_2$ are opposite in sense.

Where an input signal $S_2$, opposite in sense to the input signal $S_1$, is applied to the base of the second transistor $Q_2$ through the terminal $\mathbf{5}_2$, current flowing across the resistor 2 becomes twice as large as when the input signal $S_1$ is suplied only to the transistor $Q_1$. Therefore the levels of the output signals $\mathbf{11}_1$ and $\mathbf{11}_2$ derived at the terminals $\mathbf{6}_1$ and $\mathbf{6}_2$ become twice as high as when the input signal $S_1$ is fed only to the transistor $Q_1$.

The DC levels of the outputs derived at the terminals $\mathbf{6}_1$ and $\mathbf{6}_2$ are different depending on whether or not the circuit serves as a differential amplifier. However, if the difference between the output voltages derived from the terminals $\mathbf{6}_1$ and $\mathbf{6}_2$ is picked up as an output, the output DC levels in both cases can be made equal to each other as shown in FIG. 5D by equalizing the voltage drops of the resistors $R_1$ and $R_2$ due to the collector DC currents $I_0$. Since the output signals $\mathbf{11}_1$ and $\mathbf{11}_2$ are opposite in sense, the level of the AC output 13 which is produced in the case of the circuit acting as a differential amplifier becomes twice as high as those of the signals $\mathbf{11}_1$ and $\mathbf{11}_2$.

Figure 3:
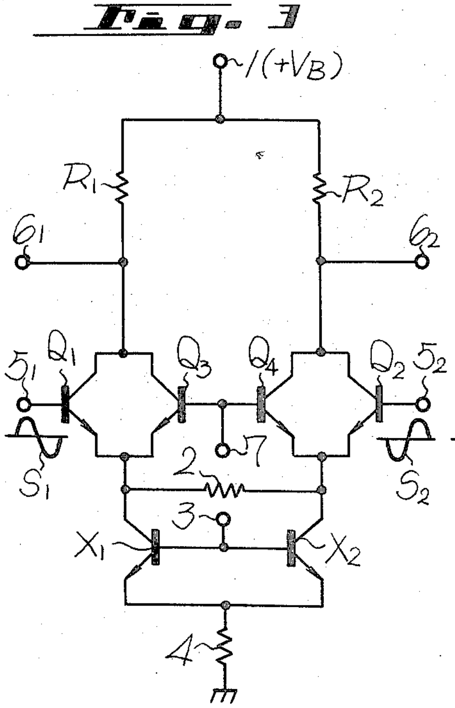
FIGS. 3 and 4 illustrate modified forms of the transistor circuit of this invention.

FIG. 3 illustrates a modification of this invention, which has substantially the same connections as those of the circuit of FIG. 1 except that the collectors of the transistors $Q_3$ and $Q_4$ are respectively connected to the collectors of the transistors $Q_1$ and $Q_2$. With such an arrangement, even when the transistors $Q_1$ and $Q_2$ are in the "off" state, the transistors $Q_3$ and $Q_4$ are switched "on" to flow their collector DC currents $I_0$ to the resistors $R_1$ and $R_2$, so that the level of the DC voltage derived at the terminal $\mathbf{6}_1$ or $\mathbf{6}_2$ becomes equal to the DC level as shown in FIG. 5E.

Figure 4:
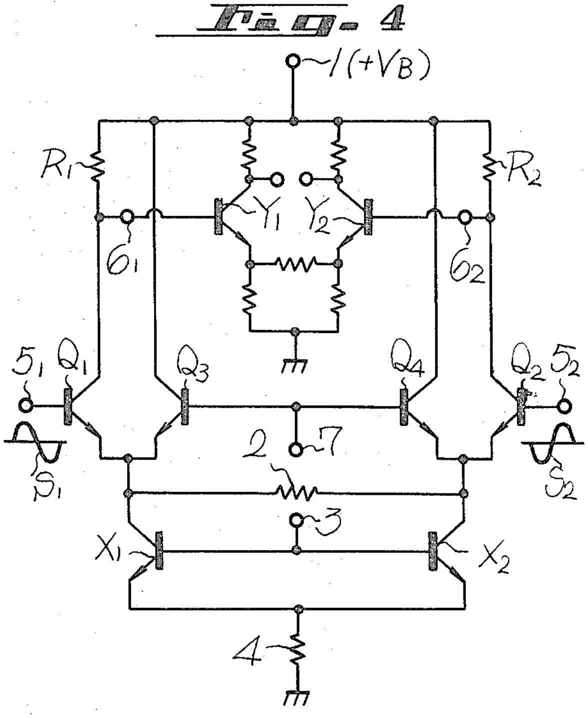

Even if the collectors of the transistors $Q_3$ and $Q_4$ are not connected to those of the transistors $Q_1$ and $Q_2$ as in the case of FIG. 3, the output DC levels can be rendered equal to each other as depicted in FIG. 5D as in the case of FIG. 3 by applying the outputs derived at the terminals $\mathbf{6}_1$ and $\mathbf{6}_2$ of the circuit of FIG. 1 to the bases of transistors $Y_1$ and $Y_2$ constituting a differential amplifier as shown in FIG. 4.

In the example of FIG. 3 the two pairs of transistors $Q_1$, $Q_2$ and $Q_3$, $Q_4$ are employed, but the third or fourth transistor $Q_3$ or $Q_4$ may be dispensed with.

Figure 6A:
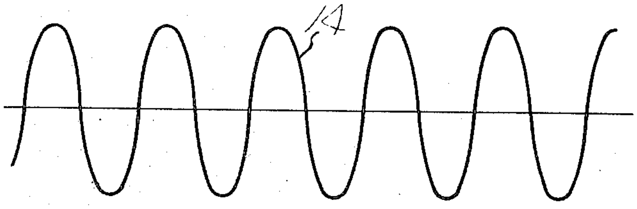
FIGS. 6A chrough 6E illustrate a series of waveforms for explaining the operation of the transistor circuit of this invention when used as a synchronous detector.
Figure 6B:
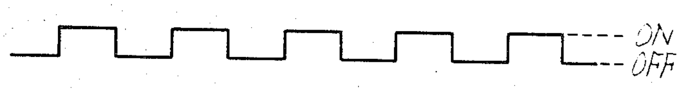
Figure 6C:
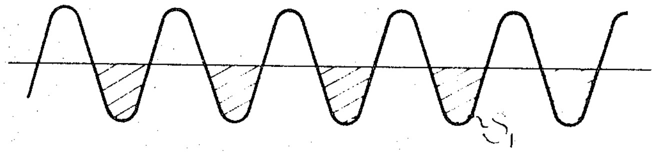

In the event that the frequency of the sinusoidal control signal 14 is selected to be the same as that of the input signal $S_1$, and assuming the input signal $S_1$ to be in phase with the control signal 14 as depicted in FIG. 6C, then the first and second transistors $Q_1$ and $Q_2$ are switched "on" in the negative half cycle of the input signal $S_1$ as indicated by oblique lines in FIG. 6C. Consequently, the mean value of the current flowing across the load resistor $R_1$ at this time becomes a minimum.

Figure 6D:
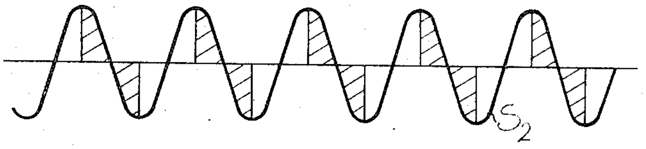

When the input signal $S_1$ advances 90° relative to the control signal 14 as illustrated in FIG. 6D, the first and second transistors $Q_1$ and $Q_2$ are turned "on" in the half cycle from the positive to the negative peak of the input signal $S_1$. Accordingly, the mean value of the current flowing through the load resistor $R_1$ at this time is zero.

Figure 6E:
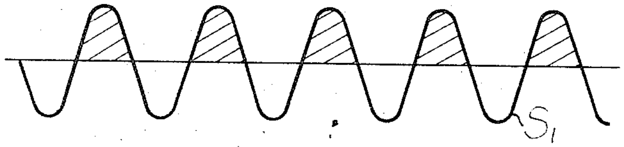

Further, in the event that the input signal $S_1$ advances 180° relative to the control signal 14 as depicted in FIG. 6E, the first and second transistors $Q_1$ and $Q_2$ are switched "on" in the positive half cycle of the input signal $S_1$, so that the mean value of signal current flowing across the load resistor $R_1$ becomes a maximum.

Therefore, by picking up the output from the output terminal $\mathbf{6}_1$ through a low-pass filter, an output voltage is derived from the filter in proportion to the phase difference between the input signal $S_1$ and the sinusoidal control signal 14. Consequently, if the input signal $S_1$ is a modulated signal of the same frequency, a demodulated output can be obtained, thus achieving the so-called synchronous detection.

Accordingly, the transistor circuit of this invention is applicable to a color demodulator circuit for color television receivers. In such a case a composite color signal subcarrier consisting of color subcarriers of 3.58 MHz which are respectively modulated by I and Q signals and are phased 90° apart from each other is applied to the input terminals and reference signals of 3.58 MHz which are respectively in phase with the color subcarriers are supplied as a control signal, thereby to obtain respective color signal components.

Figure 7:
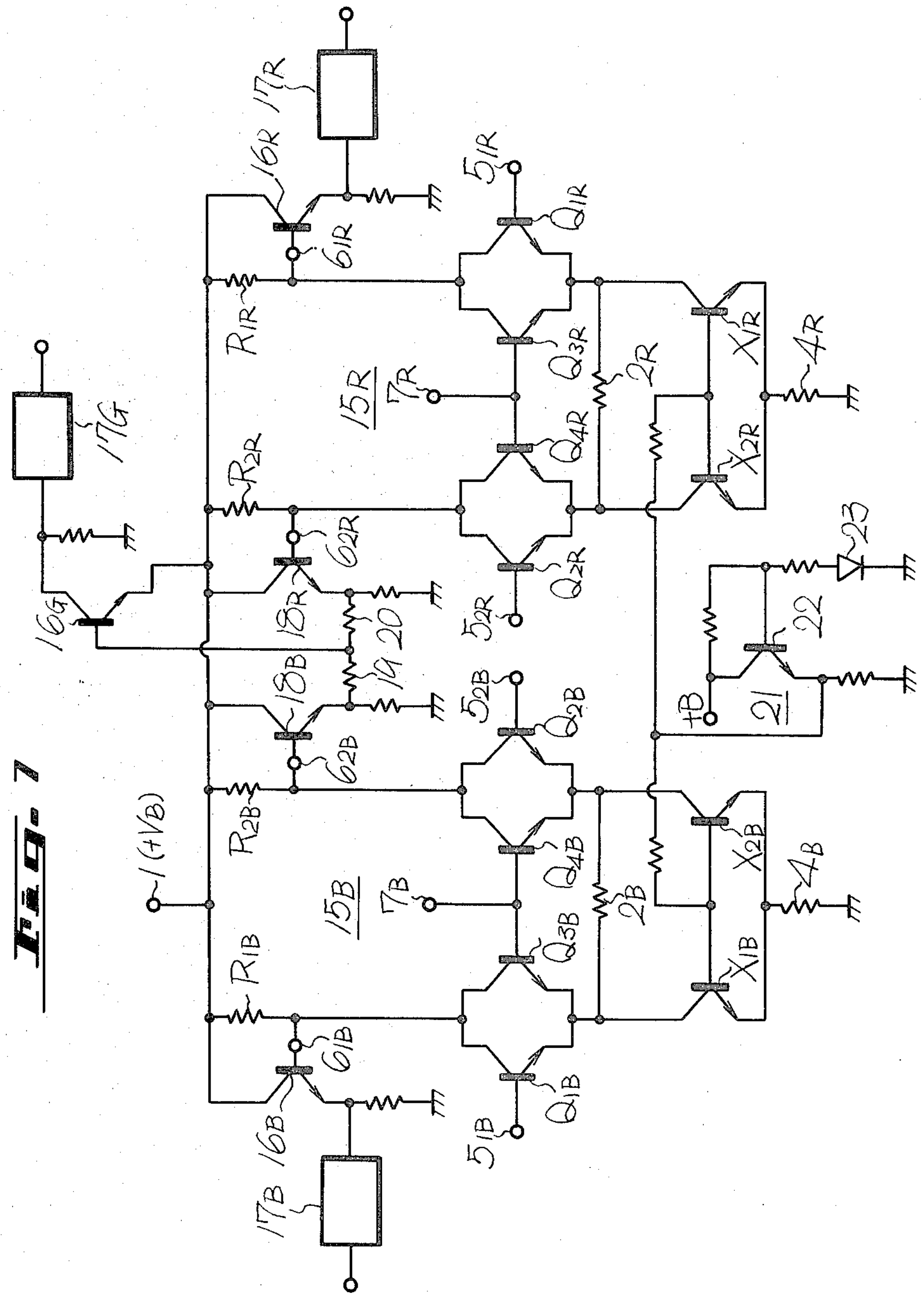
FIG. 7 is a schematic of a color demodulator according to the present invention.

FIG. 7 illustrates another modification of the transistor circuit of this invention as being applied to a color demodulator circuit. Reference numerals 15R and 15B respectively indicate color demodulator circuits for producing red and blue color difference signals R-Y and B-Y. These circuits are each identical to the circuit shown in FIG. 3, and corresponding elements are identified by the same reference numerals but with suffixes R and B respectively indicating the elements of the red and blue color demodulator circuits 15R and 15B. A color subcarrier signal consisting of subcarriers of 3.58 MHz displaced 90° in phase apart from each other which are respectively amplitude-modulated by the red and blue color difference signals R-Y and B-Y is respectively applied to input terminals $\mathbf{5}_{1R}$ and $\mathbf{5}_{1B}$ of the demodulator circuits 15R and 15B, while a signal opposite in sense to the color subcarrier signal is supplied to the other input terminals $\mathbf{5}_{2R}$ and $\mathbf{5}_{2B}$ of the circuits 15R and 15B.

A control signal input terminal 7R of the red color demodulator circuit 15R is supplied with a reference signal of 3.58 MHz in phase with the subcarrier modulated by the red color difference signal R-Y, and a control input terminal 7B of the blue color demodulator circuit 15B is supplied with a reference signal of 3.58 MHz in phase with the subcarrier modulated by the blue color difference signal B-Y. Thus, as will be apparent from the foregoing, the red color difference signal R-Y is derived from the circuit 15R through a low-pass filter 17R. If necessary, an emitter-follower type amplifying transistor 16R may be used.

The blue color difference signal B-Y is derived from the circuit 15B by applying the output at the terminal $6_{1B}$ to a low-pass filter 17B. If necessary, an amplifying transistor 16B may also be used.

A green color difference signal G-Y can be produced by a similar color demodulator circuit. In the illustrated example, however, the green color difference signal G-Y is derived from the red and blue color difference signals R-Y and B-Y by matrixing. Namely, the bases of transistors 18R and 18B interconnected in a matrix circuit and are respectively connected to terminals $6_{2R}$ and $6_{2B}$ of the demodulator circuits 15R and 15B. The connection point of resistors 19 and 20 is coupled to a low-pass filter 17G and if necessary through an emitter-follower type amplifying transistor 16G. The resistance values of the resistors 1 and 20 are predetermined to produce the green color difference signal G-Y which consists of the red and blue color difference signals R-Y and B-Y added together at the proper ratio.

Reference numeral 21 designates a constant-voltage circuit for supplying a fixed bias voltage to the bases of transistors $X_{1R}$, $X_{2R}$ and $X_{1B}$, $X_{2B}$ which serve as constant-current sources for the demodulator circuits 15R and 15B. The constant-current circuit 21 is shown to be of such precise construction that a diode 23 is connected to the base of an emitter-follower type transistor 22 for temperature compensation.

The present invention is applicable not only to the R-Y, G-Y and B-Y demodulation systems but also to I, Q and X,Z demodulation systems.

In the foregoing, the emitters of the first and second transistors $Q_1$ and $Q_3$ are interconnected through a resistor but may be interconnected through other impedance elements or may be short-circuited. The constant current sources need not always be made up of transistors and may be formed, for example, from large resistors.

In the foregoing examples npn-type transistors are employed but may be replaced with pnp-type transistors. Furthermore, field effect transistors may be used, in which case they may be connected in exactly the same manner as in the foregoing examples, if the base, emitter and collector of the npn- or pnp-type transistors are respectively regarded as the gate, source and drain of the field effect transistor.

We claim as our invention:

1. A transistor circuit comprising: a first pair of transistors, each having first, second and third electrodes, means for supplying an input signal to the first electrodes of each of said pair of transistors, a constant current source being coupled to second electrodes of said pair of transistors, a power supply, a source of relatively low potential, a first impedance element coupled between the power supply and the third electrode of each of said pair of transistors, a second impedance element coupled between the second electrodes of said pair of transistors, a second pair of transistors being coupled in parallel with respective transistors of said first pair, the bases of said second pair of transistors being coupled together, and means for applying a control signal to the bases of said second pair of transistors, said constant current source including a third pair of transistors having their bases coupled together and a fixed bias applied to the common bases of the two transistors, the constant current source transistors having one other terminal coupled to the second electrodes of the first pair of transistors and having another pair of terminals coupled together and conducting to a source of relatively low potential.

2. A transistor circuit according to claim 1 wherein the third electrodes of said second pair of transistors are connected to said power supply.

3. A transistor circuit according to claim 2 further including a fourth pair of transistors with the third electrodes of each of said first pair of resistors respectively connected to the bases of said fourth pair of transistors, means for deriving an output signal from the collectors of said fourth pair of transistors, said collectors coupled to said power supply, and the emitters of said fourth pair of transistors coupled to said relatively low potential.

4. A transistor circuit according to claim 1 wherein said input signal applied to said first pair of transistors is a color subcarrier signal which includes sidebands which is applied to said first pair of transistors in opposite phase to each other, and said control signal comprises a signal having the same frequency as said input signal and having a phase of the desired output signal, and an output signal removed from the third electrodes of said first pair of transistors.

* * * * *